(12) United States Patent
Klos et al.

(10) Patent No.: US 12,393,169 B2
(45) Date of Patent: Aug. 19, 2025

(54) METHOD AND APPARATUS FOR MONITORING INDUSTRIAL DEVICES

(71) Applicant: Siemens Aktiengesellschaft, Munich (DE)

(72) Inventors: Hans-Henning Klos, Weigendorf (DE); Vladimir Lavrik, Dreieich (DE); Christoph Paulitsch, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 494 days.

(21) Appl. No.: 17/928,402

(22) PCT Filed: May 17, 2021

(86) PCT No.: PCT/EP2021/062933
§ 371 (c)(1),
(2) Date: Nov. 29, 2022

(87) PCT Pub. No.: WO2021/244838
PCT Pub. Date: Dec. 9, 2021

(65) Prior Publication Data
US 2023/0205161 A1  Jun. 29, 2023

(30) Foreign Application Priority Data
Jun. 2, 2020 (EP) ..................... 20177830

(51) Int. Cl.
*G05B 19/042* (2006.01)
*G05B 19/418* (2006.01)

(52) U.S. Cl.
CPC ..... *G05B 19/0423* (2013.01); *G05B 19/4184* (2013.01)

(58) Field of Classification Search
None
See application file for complete search history.

(56) References Cited

U.S. PATENT DOCUMENTS

| 8,209,080 B2 | 6/2012 | Prokhorov et al. |
| 2019/0036952 A1 | 1/2019 | Sim et al. |

(Continued)

FOREIGN PATENT DOCUMENTS

| CN | 108805015 A | 11/2018 |
| CN | 109521725 A | 3/2019 |

(Continued)

OTHER PUBLICATIONS

PCT International Search Report and Written Opinion of International Searching Authority mailed Aug. 9, 2021 corresponding to PCT International Application No. PCT/EP2021/062933.

*Primary Examiner* — Carlos R Ortiz Rodriguez
(74) *Attorney, Agent, or Firm* — Lempia Summerfield Katz LLC (57) ABSTRACT

A method for monitoring of industrial devices includes: receiving sensor signal data of one or more industrial devices and one or more events associated with the operation of the one or more industrial devices. The method further includes: identifying, (e.g., using a first autoencoder), an abnormal behavior of the one or more industrial devices based on the sensor signal data; creating or updating an additional autoencoder based on the sensor signal data associated with a time window relating to the abnormal behavior; and associating events located within the time window with the additional autoencoder.

16 Claims, 8 Drawing Sheets

(56) References Cited

U.S. PATENT DOCUMENTS

| | | |
|---|---|---|
| 2019/0087738 A1 | 3/2019 | Yang et al. |
| 2019/0204820 A1 | 7/2019 | Andrassy et al. |
| 2019/0286506 A1 | 9/2019 | Cheng et al. |
| 2020/0057939 A1 | 2/2020 | Ohashi et al. |

FOREIGN PATENT DOCUMENTS

| | | |
|---|---|---|
| EP | 3223095 A1 | 9/2017 |
| GB | 2563280 A | 12/2018 |
| GB | 2567850 A | 5/2019 |
| WO | 2017198909 A1 | 11/2017 |
| WO | 2018224669 A1 | 12/2018 |
| WO | 2018224670 A1 | 12/2018 |

| date | time | assembly part | damage | i |
|---|---|---|---|---|
| 13.11.2016 | 20:55:43 | positioning station 3 | drive | adjusted tool protection PS3 |
| 14.11.2016 | 00:29:30 | positioning station 4 | drive | adjusted position tool 4, PS3 |
| 14.01.2017 | 08:36:40 | positioning station 5 | stencil | position part tool 4 adjusted, exchanged suction |
| 21.01.2017 | 04:16:52 | positioning station 6 | drive | work shift 3, part dented on the roof frame C-pillar, n. OK, PS3e |
| 21.01.2017 | 05:00:00 | positioning station 7 | drive | |
| 26.01.2017 | 22:45:03 | positioning station 8 | stencil | tool exchange could not be continued --> cause stencil damage |
| 05.02.2017 | 21:38:32 | positioning station 9 | drive | adjusted to 45° and checked automation due to suction indentation |
| 05.05.2017 | 10:20:00 | positioning station 10 | drive | |
| 22.07.2017 | 00:48:00 | positioning station 11 | drive | |
| 22.07.2017 | 00:50:00 | positioning station 12 | drive | |

METHOD AND APPARATUS FOR MONITORING INDUSTRIAL DEVICES

The present patent document is a § 371 nationalization of PCT Application Serial No. PCT/EP2021/062933, filed May 17, 2021, designating the United States, which is hereby incorporated by reference, and this patent document also claims the benefit of European Patent Application No. 20177830.5, filed Jun. 2, 2020.

TECHNICAL FIELD

The present disclosure relates to sensor signal data analysis and, more particularly, to monitoring of industrial devices, e.g., in an industrial installation.

BACKGROUND

The present embodiments are in the field of maintenance, startup, and monitoring of large-scale technical systems, such as medical and aircraft systems, process systems, or other systems that include many dynamically configurable components and may be subject to constant revision. Maintaining stability and integrity of industrial devices in an industrial installation is a high priority. Industrial devices include, for example, motor drives, and in particular converters. Industrial devices may provide sensor signal data either representative of the process in the industrial installation or of the status of the industrial device itself.

In order to provide an analysis and in particular identify the (root) cause of abnormal behavior of industrial devices in those installations, domain experts nowadays compare the timestamps of events in log files to an abnormal behavior, (e.g., an anomaly), in sensor signal data and decide if the event and the anomaly are sufficiently close to consider the event description as a label for an anomaly. If an unsupervised learning setting is to be achieved, identification of abnormal behavior may be performed solely on sensor signal data itself without taking other type of data, e.g., from other sources, into account. Sometimes rule based approaches try to combine the unsupervised sensor signal data clustering with explicitly coded or formally described expert knowledge.

Patent application CN 108805015 A proposes a weighted convolutional autoencoder long short-term memory network for anomaly detection in background and foreground, globally and locally in image flows of mobile pedestrians. Labels are learned from an original data channel and corresponding optical flow channel.

Patent applications WO 2018/224670 A1 and GB 2563280 A propose to train an autoencoder on clustered time series, build a probabilistic model of the reconstruction errors of tested autoencoders and detect reconstruction errors as anomalous in the domain of network communication.

Instead of using probabilistic models patent application WO 2018/224669 A1 proposes calculation of the derivatives of reconstruction errors and training a machine leaning model to define a filter for anomalous network communication.

In U.S. Pat. No. 8,209,080 B2, textual cause and symptom data is treated as an input for teaching the autoencoder.

Patent application WO 2017/198909 A1 also describes a procedure where data elements are tagged before teaching an autoencoder.

Patent application US 2019/036952 A1 proposes to generate a plurality of encoders on the basis of network traffic data and image data on the basis of network traffic data as a detection target. The image data is generated based on message strings using one-hot vectors.

SUMMARY

None of these solutions discussed above solve the problem of labeling data with free-text information in an automated way. To automate the detection of abnormal behavior of industrial devices based on sensor signal data, feature-based analysis algorithms are traditionally used. Autoencoders are introduced to solve the task of classification based on the sensor signal data itself without the need of custom defined signal feature extractors.

Training of these autoencoders, as well as the tailoring of the features for the traditional analysis, needs neatly labeled datasets. Until now, this has been done manually by experts of the respective domains. Moreover, a lot of effort is needed to label anomalies detected in an industrial installation so that they may be used for supervised learning of prediction models for maintenance and/or production optimization.

Efforts in digitalizing the shop floor by introducing paperless workstreams regarding maintenance and repair tasks introduce means to write reports as free unstructured text. The texts in the reports contain the information on the repair and/or maintenance tasks but are not necessarily following a common wording schema (dictionary). Furthermore, those texts may contain typing errors, special technical terms, and a mixture of language. These "free-text" information is only loosely coupled with the point in time of the work undertaken, as the timestamp may not necessarily be nicely aligned with the sensor signal data measured and may only be a retrospective action undertaken over a period of time where the domain expert or service technician may express assumptions that might be subjective or based on a tiny timeframe of inspection in comparison to the scope of the continuously ongoing measurement generating sensor signal data.

It is an object of the present disclosure to provide a sophisticated, generic method of sensor signal data analysis, configured to evaluate and interpret sensor signal data of one or more of industrial devices.

The scope of the present disclosure is defined solely by the appended claims and is not affected to any degree by the statements within this summary. The present embodiments may obviate one or more of the drawbacks or limitations in the related art.

The object is achieved by the following aspects.

According to a first aspect, the object is achieved by a method for monitoring industrial devices. The method includes receiving sensor signal data of one or more industrial devices and one or more events associated with the operation of the one or more industrial devices. The method further includes identifying, (e.g., using a first autoencoder), an abnormal behavior of the one or more industrial devices based on the sensor signal data. The method further includes creating or updating an additional autoencoder based on the operational data associated with a time window relating to the abnormal behavior, and associating events located within the time window with the additional autoencoder.

According to a second aspect, the object is achieved by an apparatus operative to perform the method acts according to the first aspect.

According to a third aspect, the object is achieved by a computer program product, including program code that when executed performs the method acts according to the first aspect.

The computer program product may include a computer program for carrying out the method according to the first aspect, when the computer program is loaded in a working memory of a computer or the apparatus of the second aspect and is executed by the computer or the apparatus, respectively.

DETAILED DESCRIPTION

Figure 1:
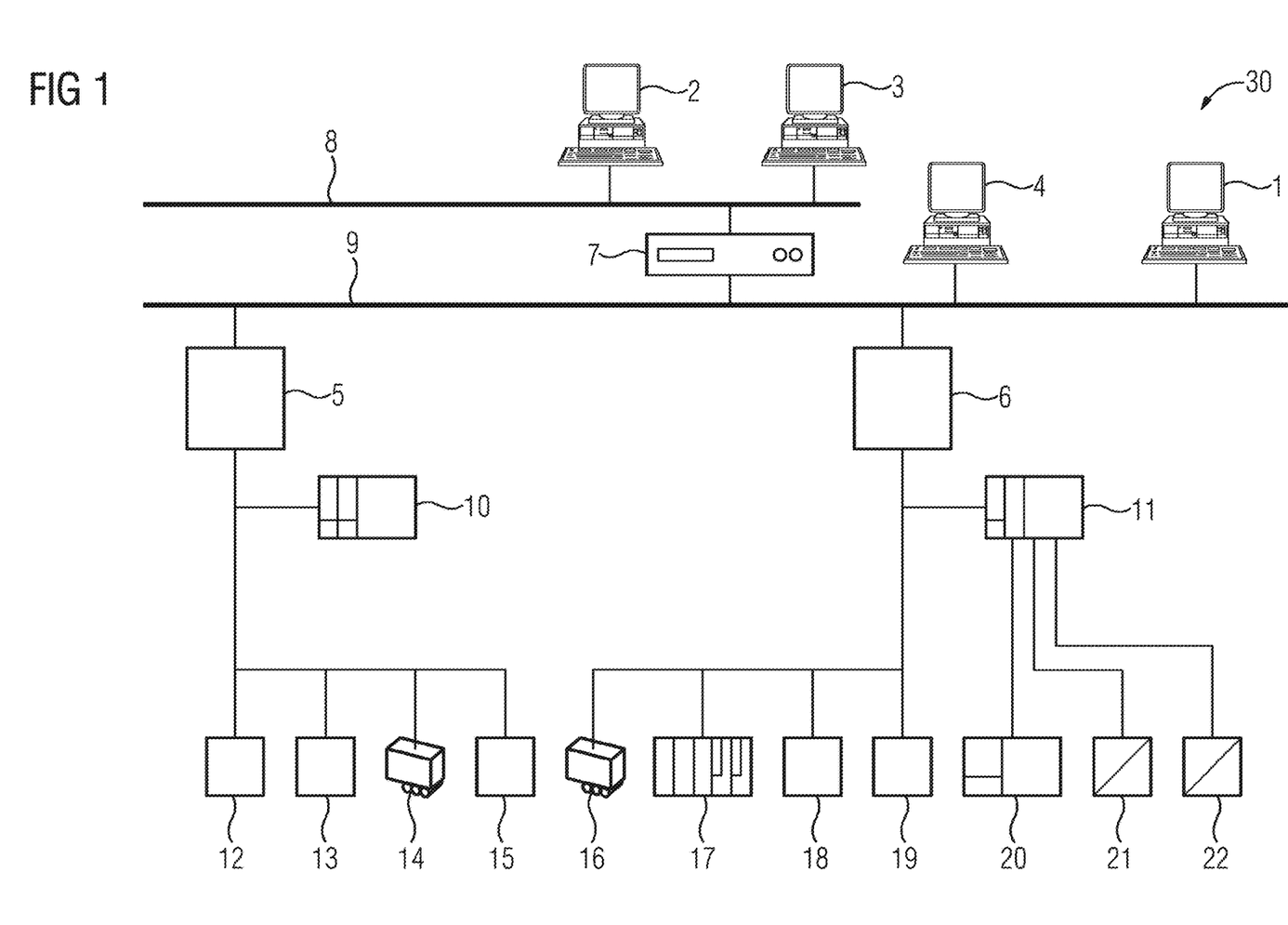
FIG. 1 depicts a schematic illustration of an industrial installation.

FIG. 1 shows an industrial installation including multiple industrial devices such as control devices, operating devices, sensor and/or actuators. The industrial installation 30 has an industrial Ethernet bus 9, which provides a data connection between two identically or differently configured control devices 5 and 6, an operating computer 4 and a commissioning computer 1. The industrial Ethernet bus 9 is connected to a standard Ethernet bus 8 via a computer 7. An operating computer 2 and a central operating computer 3 are connected to the standard Ethernet bus 8. Via a bus system, which is designed as a Profibus, various actuators or sensors 12, 13, 14, 15 are provided with a data connection to the control device 5. The industrial device may also be connected via Profinet or Industrial Ethernet. The industrial devices monitored may also be assets, machines, which themselves are not connected to the bus system of the automation system. For example, the industrial device may be a pipe. Furthermore, a decentralized peripheral control device 10 is connected to the control device 6 via the bus system. Via the bus system, which is designed as a Profibus, various actuators or sensors 16, 17, 18, 19 are provided with a data connection to the control device 6. Furthermore, a decentralized peripheral control device 11 is connected to the control device 6 via the bus system. Via the decentralized peripheral control device 11, various actuators and sensors 20, 21, 22 may be driven or evaluated via the control device 6. The operating computers 2, 3, 4, the control devices 5, 6, the decentralized peripherals 10, 11, the actuators or sensors 12, 13, 14, 15, 16, 17, 18, 19, 20, 21, 22 and the bus systems 8, 9 serve the operation of the industrial installation.

Monitoring industrial devices may serve to maintain stability and integrity of industrial devices. Industrial devices may be locally or remotely monitored for anomalies and/or patterns indicative of failure. Traditionally, industrial devices have been locally monitored. However, industrial devices may not always be easily accessed. Furthermore, service technicians may need to go on-site in order to access the data retrieved from the one or more industrial devices in order to identify abnormal behavior, (e.g., anomalies and/or patterns indicative of failure), of the one or more industrial devices. In addition, sending maintenance and/or repair personnel to a field installation of the one or more industrial devices may be costly. Hence, remote monitoring and/or diagnosing provides a solution to these challenges.

Previous remote monitoring implementations involved customized software and infrastructure configurations, which are cumbersome to maintain and update. Further, on-premise data collection required by such remote monitoring systems consumes large amounts of data storage. Moreover, because potentially sensitive plant data is to be transmitted to a remote viewer, secure data transmission channels are required.

An apparatus 2 for monitoring one or more of the industrial devices may be present in the industrial installation. The apparatus 2 may be included in one of the sensors or actuators or in one of the control units. The apparatus 2 may be part of an apparatus, such as an industrial PC, which is only temporarily connected to the industrial installation. Furthermore, the apparatus 2 may be located remotely from the industrial installation.

Figure 2:
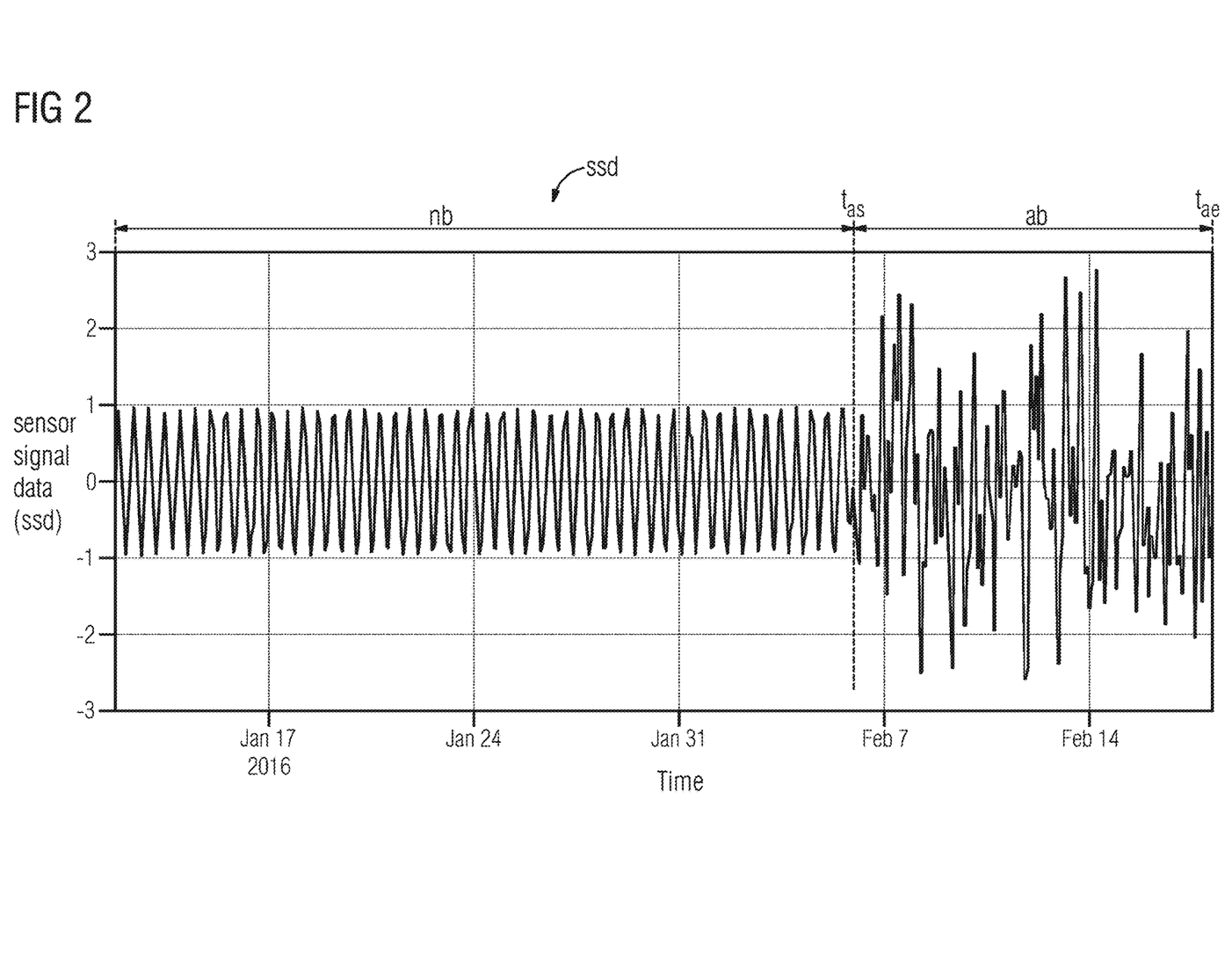
FIG. 2 depicts a schematic illustration of sensor signal data.

Sensor signal data are conventionally converted from analog to digital data and digitally analyzed by various signal processing techniques to extract features from the digitized signal data, relevant in the context of a particular application. Examples of signal processing techniques which are well-known to those skilled in the art include, but are not limited to, transforms (Fourier, Wavelets), integration, differentiation and derivation, thresholding, fitting to mathematical functions, etc. Now, sensor signal data may be acquired by the apparatus 2, to which one or more sensors are operatively connected. An exemplary sensor signal data curve is shown in FIG. 2. The apparatus 2 may acquire sensor signal data from the various sensors. For example, a sensor may be part of an industrial device. Data acquisition of sensor signal data as such is well known in the prior art, and for the purpose of the present disclosure no further description and discussion thereof seems required. For example, the sensor signal data may include and/or be representative of information of a current sensor or a vibration sensor of a converter.

As is known, problems frequently arise within an industrial installation, especially an industrial installation having a large number of industrial devices and supporting equipment. These problems may take the form of broken or malfunctioning industrial devices, logic elements, such as software routines, residing in improper modes, process control loops being improperly tuned, one or more failures in communications between industrial devices within the industrial plant, etc. These and other problems, while numerous in nature, may result in the process operating in an abnormal behavior (e.g., the industrial plant being in an abnormal situation) which may be associated with suboptimal performance of the industrial plant.

Abnormal behavior may exist for some time before it is detected, identified, and corrected, resulting in the suboptimal performance of the industrial installation for the period of time during which the problem is detected, identified, and corrected. Thus, monitoring of the one or more industrial devices is needed. For example, abnormal behavior may cause significant damage to equipment, the loss of raw materials, or significant unexpected downtime within the industrial installation if the abnormal behavior exists for even a short amount of time. Thus, merely detecting a problem within the industrial installation after the abnormal behavior has occurred, no matter how quickly the problem is corrected, may still result in significant loss or damage within the industrial installation.

An autoencoder is an artificial neural network that learns data by encoding input data to generate a hidden layer, decoding the hidden layer to generate output data, comparing the input data with the output data, and adjusting a parameter or a weight value when the encoding and/or the decoding is performed so as to approximate the output data to the input data. The autoencoder is characterized in that, when the learning is completed, a portion performing the decoding is removed and only a portion performing the encoding is used. The portion performing the encoding may be represented as the encoder, and the portion performing the decoding may be represented as the decoder. In this disclosure, only the term autoencoder will be used. The autoencoder according to one embodiment of the present disclosure may be based on an inception-residual network-v2.

Figure 3:
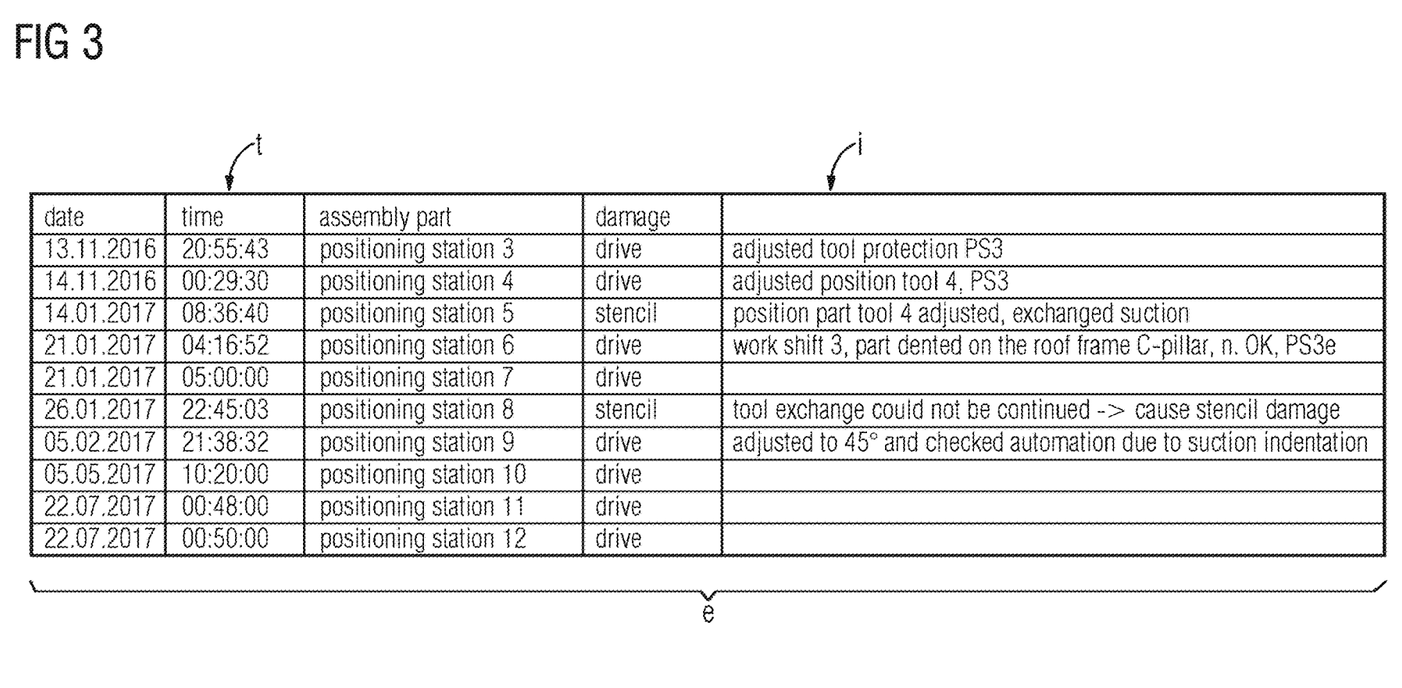
FIG. 3 depicts a schematic illustration of events.

In the following, the term "event" represents a time-based fact, observation, action, process, or a change of state of a system. For example, events, or the textual information associated with the events, may be associated with one or more autoencoders, e.g., a first autoencoder or an additional autoencoder as will be described later in more detail. An event may be received by the apparatus via a communication link between the apparatus and the industrial device. Furthermore, events may be accessible via one or more log files. A log file may include a plurality of events of one or more industrial devices. The events may help in understanding the activities in the industrial installation. Further events may be included in one or more repair reports or in reports in general, as described in the above. An exemplary excerpt of a repair report file including a plurality of events and annotated comments by a service technician is shown in FIG. 3.

However, textual log-data has not been considered yet. In addition, semantic relations between messages and the time-wise coupling of dynamic free text messages relative to the sensor signal data generated have also not been considered. Also, sensor signal data generated by an autoencoder and the (e.g., continuous) retraining of autoencoders have not been considered.

In particular, in the domain of a predictive maintenance one needs a reference signal or so-called fingerprint to compare with. In order to have this reference a calibration, called labeling, of the system during the commissioning phase needs to be carried out. This calibration may be performed by a series of measurements in order to obtain a mapping function between sensor signal data from industrial devices and a particular operation state or fault to be detected. This process may take a lot of time and effort.

A solution is proposed that is capable of performing this calibration automatically.

During a first act of "Training the one or more autoencoders," (e.g., for commissioning of the industrial devices), sensor signal data may be obtained from a system with a well-known and normal behavior. Based on this sensor signal data, a first autoencoder (the function which repeats a signal very close to the signal on which the function was trained) may be trained. This first autoencoder is able to reproduce every part of a reference signal within a certain time period. Based on the first autoencoder, one may cross-check between the signal given by the first autoencoder and the signal measured from an industrial device. Optionally, known anomalies (such as noise, jumps, outliers, constant values), may be added to the training data and specific, additional autoencoders may be trained on this data for noise, jump, outlier, and constant value detection, respectively.

In a second act of "Identifying abnormal behavior," the one or more (trained) autoencoders are applied to the one or more sensor signals and/or the respective sensor signal data, e.g., of a system during operation, for example, for the duration of a monitoring period T. If, at a certain point in time, the (measured) sensor signal data differs from sensor signal data generated by the first autoencoder, an abnormal behavior (of the one or more industrial devices) is determined. This point in time, $t_{as}$, may be recorded as the start of the abnormal behavior or anomaly. The period of time between the start, $t_{as}$, of the abnormal behavior and the end, $t_{ae}$, of the abnormal behavior characterized data representing a certain problem or fault in the industrial device or system. This sensor signal data, e.g., data obtained within the time period $t_{ae}$–$t_{as}$, may then be collected, and optionally stored, for further evaluation and/or processing.

If at a certain point in time or during a period of time the one or more measured signals or signal data, respectively, are similar, e.g., between predetermined boundaries or above or below a predetermined threshold, to the signal data generated by the respective autoencoder, (e.g., autoencoder for noise, autoencoder for jumps, autoencoder for outliers, and/or autoencoder for constant offset), an indicator for noise, jump, outlier, and/or constant value may be raised. Such an indicator may correspond to an alarm. For the sake of visualization in an alarm system, the relative importance of the alarms may be used to prioritize the detected anomalies. The indicator or alarm may be visualized in order to inform a user about the abnormal behavior detected.

In a third act of "Creating or updating an additional autoencoder," the sensor signal data from the period of time during which the first autoencoder detected an abnormal behavior may be used to train, e.g., by creating or updating, an additional autoencoder, e.g., updating one of the existing additional autoencoders. At this time, there may be no label or only an insufficient label for the additional autoencoder. The proposed solution allows for assigning a label to the newly trained additional autoencoder.

In order to provide a label for the additional autoencoder, one or more of the following acts may be performed. A service technician may establish a (repair) report in electronic form including textual information, wherein there may be one or more timestamps associated with the textual information in the report. For example, the one or more timestamps may also be in textual form and included within the (repair) report. Alternatively, the report may be a log file or the like including some textual information relating to the operation of the one or more industrial devices e.g., during the monitoring period T. The textual information may include a description of the cause of the abnormal behavior in a natural language. This textual information may be used to assign the cause for the abnormal behavior in textual form to the additional autoencoder. For example, a cause for an abnormal behavior in a mechanical press may be a broken bearing of an industrial device. Now, one or more events may be created, wherein the one or more events include at least part of the text of the description of the report and, e.g., one or more associated timestamps. Alternatively, and/or alternatively, the events are ordered according to an associated timestamp. For example, each event may include a timestamp. Then, words from the text are identified regarding their importance, e.g., according to grammatical rules. Furthermore, fill and stop words such as "and," "or," "then," "there," . . . , may be eliminated. Furthermore, words may be changed to lower case and signs such as ".", ",", or, ".", special characters "ü," . . . which do not include technical information may be deleted. In order to generate a bag-of-words model this prefiltered text in the events, which have been extracted from the (repair) report may then be condensed to nouns and relations between those nouns may identified using a semantic network. Then, the bag-of-words model may be clustered with one or more of a mixture of the following algorithms such as t-SNE, K-Means, Bayesian networks, or Word2vec to serve as labels to describe a fault or corresponding (root) cause. For example, t-SNE is used for dimension reduction in addition with K-Means for clustering and support vector machine for delimiting clusters. Subsequently, each event may be associated with a fault cluster. Methods such as K-Means with anagrams using cosine similarity or vector distance or relating event messages to words using an Event-Word Matrix and words to fault clusters using a Word-Cluster Matrix may be used. Then, the one or more clusters are associated to one or more (additional) autoencoders so that the textual information of the clusters is used to describe the meaning of the fault detected by the autoencoder with a so-called label.

Now, the case of multiple faults and multiple autoencoders is discussed. In order to assign a label of the $j_{th}$ fault to the $i_{th}$ autoencoder, a weight matrix Wij is calculated from the autoencoder output vector Ai(t) and the fault indicator vector Fj(t) over a monitoring time period T. The weight matrix with weights Wij=2AiFj/(AiAi+FjFj) indicates how well the $i_{th}$ autoencoder is connected to the jth fault. Values bigger than a preset threshold, e.g., 0.8, indicate a strong relation between the autoencoder and the fault. Additionally, appropriate warning and alarm thresholds may be defined to notify a user about the need to reassign an autoencoder to a fault. In addition, an uncertainty indicator may be introduced. The uncertainty indicator is a parameter function determined for each (type of) event, e.g., by introducing a time Δt between the appearance of the fault and the entry in a respective log file. The uncertainty indicator is thus used to set thresholds with uncertainty boundaries. As a result, one or more labeled autoencoders may be obtained. The one or more autoencoders may then, e.g., during operation of the one or more industrial devices and/or during operation of the one or more autoencoders for monitoring the one or more industrial devices, be fed with the sensor signal data of one or more industrial devices.

Figure 9A:
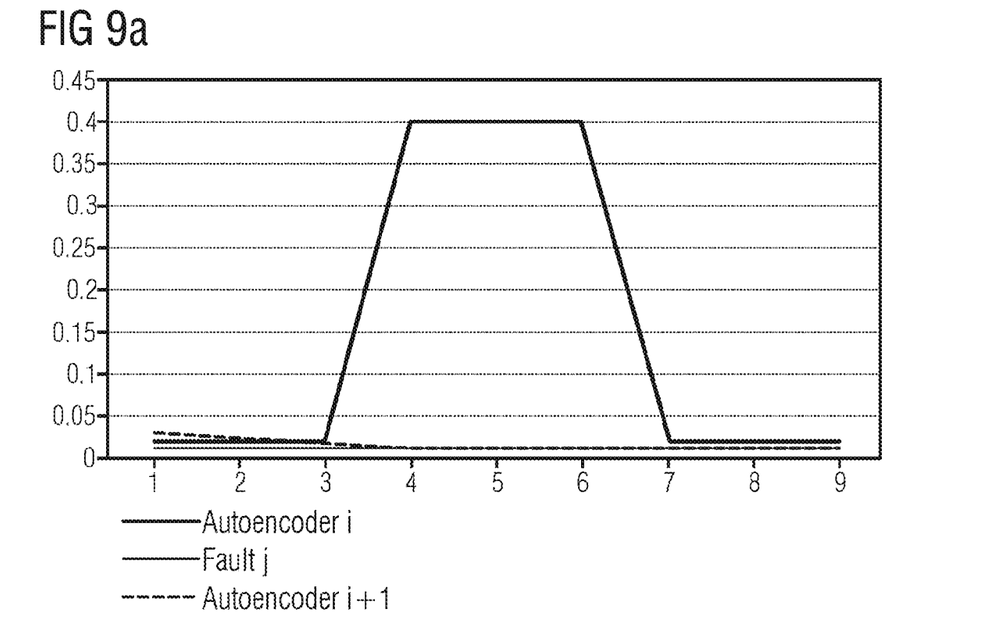
FIGS. 9a and 9b depict the correlation of autoencoders i and i+1 to the same fault j and the respective weights Wij and Wi+1 j.
Figure 9B:
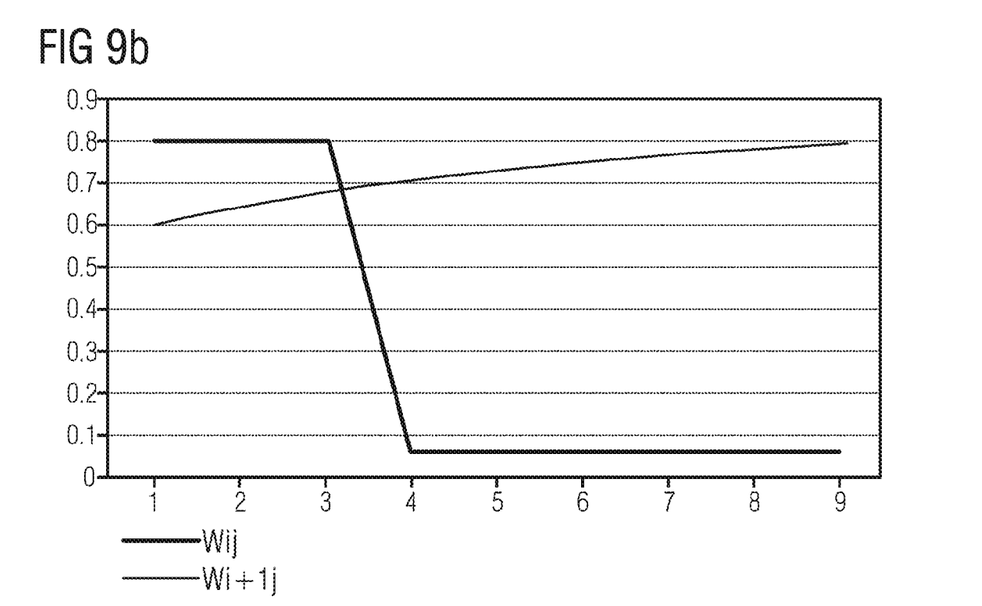
Figure 10A:
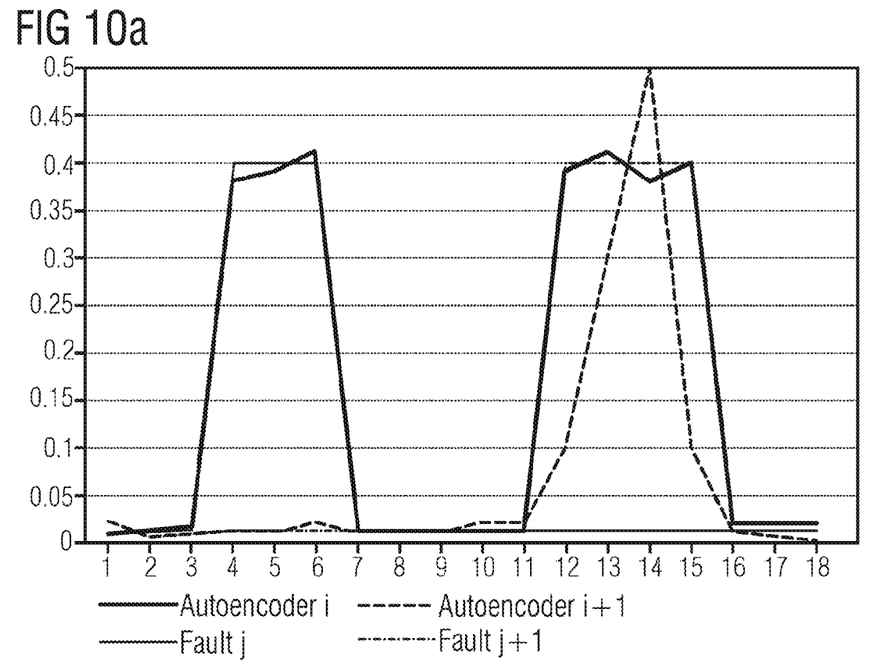
FIGS. 10a and 10b depict the correlation of autoencoder i and i+1 to faults j and j+1 and respective weights Wij, Wij+1 and Wi+1 j+1.
Figure 10B:
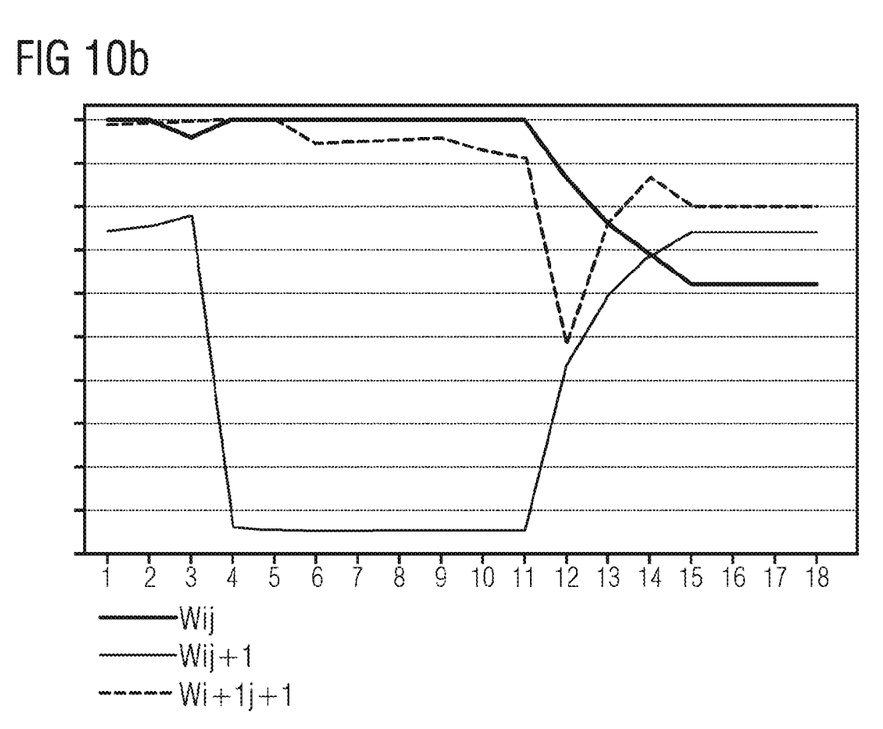

In a further act, existing autoencoders may be updated. For example, if the weight matrix Wij has similar values for different I or j, the existing autoencoders may be combined. Then the process, e.g., the autoencoder creation and/or update cycle, may return to the first act of "Training the one or more autoencoders." If several autoencoders, e.g., i and i+1, correlate to the same fault j a combined autoencoder for fault j is trained as shown in FIGS. 9a and 9b. Therein in FIG. 9a the output, e.g., reconstruction error, of autoencoder i and autoencoder i+1 as well as Fault (indicator) j is shown, whereas FIG. 9b shows the weight matrix changes of weight matrix Wij and weight matrix Wi+1 j. If an autoencoder i has similar weights for faults j and j+1 autoencoders i and i+1 are combined for the detection of fault j+1, cf. FIGS. 10a and 10b. As starting point for the training of the combined autoencoder i+2 with datasets from fault j and j+1, respectively, areas with identical structure and weights are identified in the autoencoders i and i+1 as shown in FIGS. 10a and 10b. The number of faults and autoencoders the updating procedure converges to depends on the level of detail of the log file entries. The detail of the log files entries may be controlled by the service technician.

The further operation and continued monitoring enables detecting any new previously unseen abnormal behavior, (re-)train an (additional) autoencoder and provide a labeling process. Hence labeling of one or more autoencoders, e.g., based on the one or more log files and/or one or more report texts may be performed. By log file and/or report text a structured or unstructured textual information is assumed, which may be generated at the time or after the abnormal behavior is detected and/or at the time or after a repair is performed. These may be maintenance reports or industrial PC logs. Furthermore, a feedback loop for a training and detection process is proposed. Every time an abnormal behavior is detected a time period is determined for collecting additional data and (re-train the one or more autoencoder with new and up to date sensor signal data and textual information.

Accordingly, an automatic labeling of one or more autoencoders is provided that reduces work effort for setting up a monitoring and/or diagnostic system of one or more industrial devices, e.g. in an industrial installation. The solution allows for turning unsupervised machine learning settings into supervised ones. Thereby the anomaly detection robustness, e.g., detection of abnormal behavior, is improved. With the usage of a feedback loop, one may improve detection of abnormal behavior and classify related events. An improvement to the creation of an event vocabulary space to describe event clusters is also provided. A computer program, also denoted as (software) application, may be provided that executes labeling of the autoencoders in an efficient manner. For example, the computer program may be deployed onsite (with the industrial device) thereby also enabling self-learning of machine learning algorithms. An autoencoder application for industrial anomaly detection may thus be proffered. In addition, the application may include a proximity score, also termed uncertainty indicator in the above, to identify temporal proximity between anomaly detection and log file entry timestamps. Furthermore, vocabulary clustering from log file data, e.g., textual information, for industrial failure label definition is proposed.

Thus, textual information with given timestamps may be input and is automatically associated with an abnormal behavior that has been automatically detected by unsupervised training of one or more autoencoders. Hence, labels may be input by way of a file or manually via a graphical user interface. Furthermore, the output of the application includes labels to the sensor signal data. Characteristic inputs from data files are event logs and time series data resulting in labeled data output. The disclosure as described herein proposes autoencoder based machine learning and deals with unsure time relations. It also deals with defining a vocabulary space based on textual event descriptions and its relation to time series anomalies detected by autoencoders.

Figure 4:
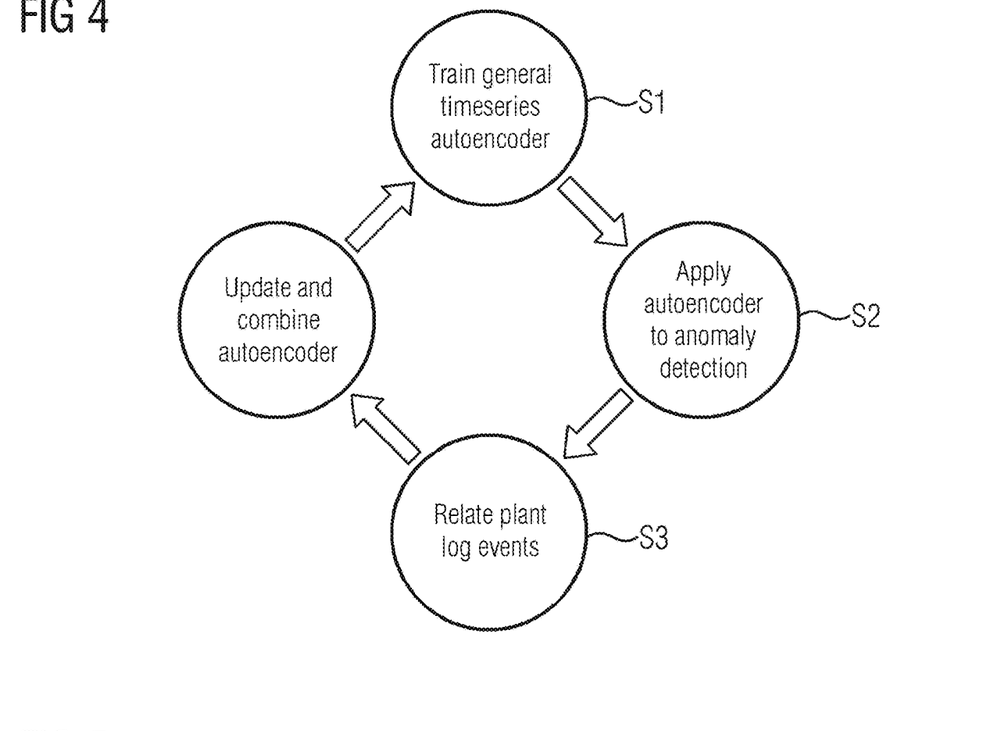
FIG. 4 depicts exemplary method acts for monitoring industrial devices.

Now turning to FIG. 4, a further embodiment including exemplary method acts is described. In act S1, a first autoencoder is trained: "Train general timeseries autoencoder." Training of the autoencoder may be based on sensor signal data representing the normal, (e.g., wanted and intended), behavior of the industrial device and/or industrial installation. Subsequently, the autoencoder is applied to the sensor signal data in act S2: "Apply autoencoder to anomaly detection" in order to identify abnormal system behavior.

This may be done "online," (e.g., during operation of the industrial device and/or industrial installation), or may be done "offline," (e.g., based on stored sensor signal data). Subsequently, in act S3, events may be associated with the anomalies detected: "Relate plant log events." Then, the one or more autoencoders may be re-trained and/or the respective labeling of the one or more autoencoders may be updated in act S4: "Update and combine autoencoders." Finally, a notification may be initiated or sent, e.g. for signaling to a user or for triggering an alarm. The notification may be sent from an apparatus performing any one of the method acts to a control unit. The notification may be displayed to a user, e.g., on a display, such as of the apparatus itself or on a handheld device.

Figure 5:
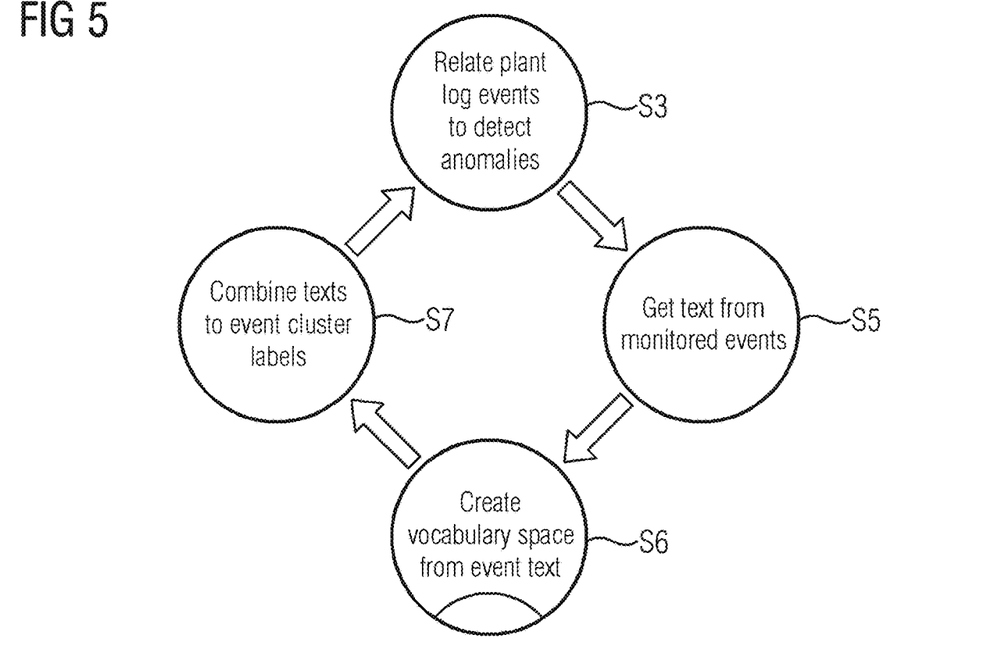
FIG. 5 depicts further exemplary method acts for monitoring industrial devices.

Now turning to FIG. 5, further exemplary method acts are shown. The acts as shown in FIG. 5 may be combined with the method acts as shown in FIG. 4. In certain embodiments, some of the acts shown in FIGS. 4 and 5 may be omitted or others may be included.

In order to relate the plant log events to the detected anomaly, textual information may be obtained in act S5: "Get text from monitored events." This textual information may be obtained from one or more log files either created automatically, e.g., by one or more of the industrial devices, or created manually, e.g., by a service technician or the like, as explained in the above. Subsequently, a vocabulary space may be crated from the event text in act S6: "Create vocabulary space from event text". Finally, the vocabulary space may be combined into one or more clusters in order to label the abnormal behavior, (e.g., anomalies), and/or respective autoencoders in act S7.

Figure 6:
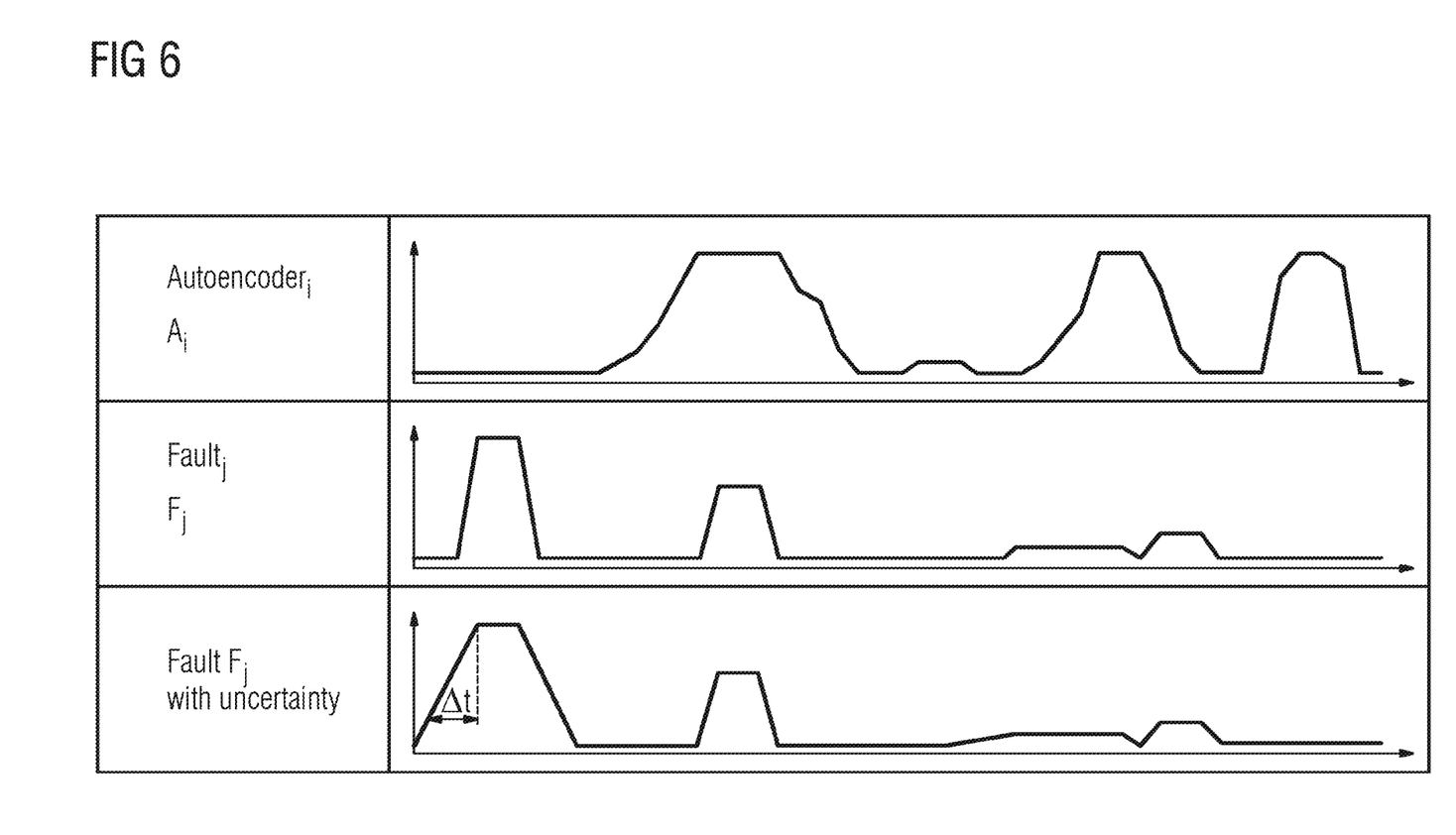
FIG. 6 depicts an illustration of a reconstruction error of an autoencoder Ai and a fault indicator Fj as well as the application of an uncertainty indicator to the fault indicator.

Turning to FIG. 6, the reconstruction error of an autoencoder Ai, the fault indicator for a fault Fj and the fault Fj with added uncertainty Δt is shown over time. To this end, a fault indicator Fi may be introduced. The fault indicator Fj may be introduced based on a timestamp of an event, e.g., in a log file. The height of the fault indicator Fj may represent the number of (relevant) words used in the log file to describe the fault or the number of words in a cluster used to identify the fault as described below. The fault indicator may be normalized based on the total number of words in the log file or based on the total number of words in the cluster representing the respective fault. The reconstruction error of the autoencoder Aj may indicate an abnormal behavior, (e.g., anomaly), of the sensor signal data. In order to deal with several faults at once, a vector representation of a fault and an autoencoder may be used.

The correlation between the fault indicator Fj and the reconstruction error Ai of the $i_{th}$ autoencoder may be indicative of how well the autoencoder is connected to the fault Fj. The correlation between autoencoder Ai and the Fault Fj may be determined based on the weight matrix:

$$W_{ij} = \frac{2A_i F_j^T}{A_i A_i^T + F_j F_j^T|}$$

Due to the misalignment of timestamps in the one or more log files and the timestamp of the sensor signal data, a proximity score or uncertainty indicator may be introduced. Thereby an uncertainty may be defined for each event, e.g., depending on the event specific detection probability. The uncertainty indicator may be a parameter function that may be determined for each type of event by observing the time Δt between the appearance of a fault and the input in the log file. Hence, a loose coupling between events and autoencoders is introduced, e.g., by allowing values between 0 and 1 and introducing statistical uncertainty boundaries.

Figure 7:
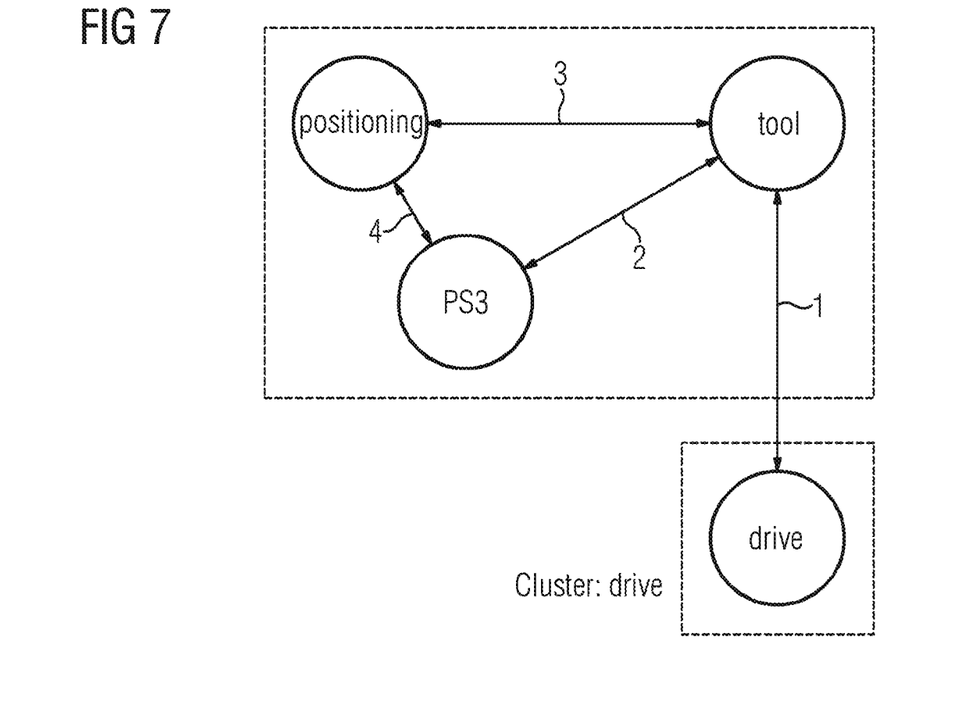
FIG. 7 depicts the generation of a vocabulary space and a definition of clusters in the vocabulary space is shown.

Turning to FIG. 7, generation of a vocabulary space and a definition of clusters in the vocabulary space is shown. The available textual information of events may be clustered based on the number of common words, e.g., using K-Means, Bayesian networks or the like. Alternatively, the number of events with single words or common words may be counted. In FIG. 7, a clustering of words based on a Bayesian Network is shown, wherein clustering is performed based on whether at least 2 events with a common word occurred.

Figure 8:
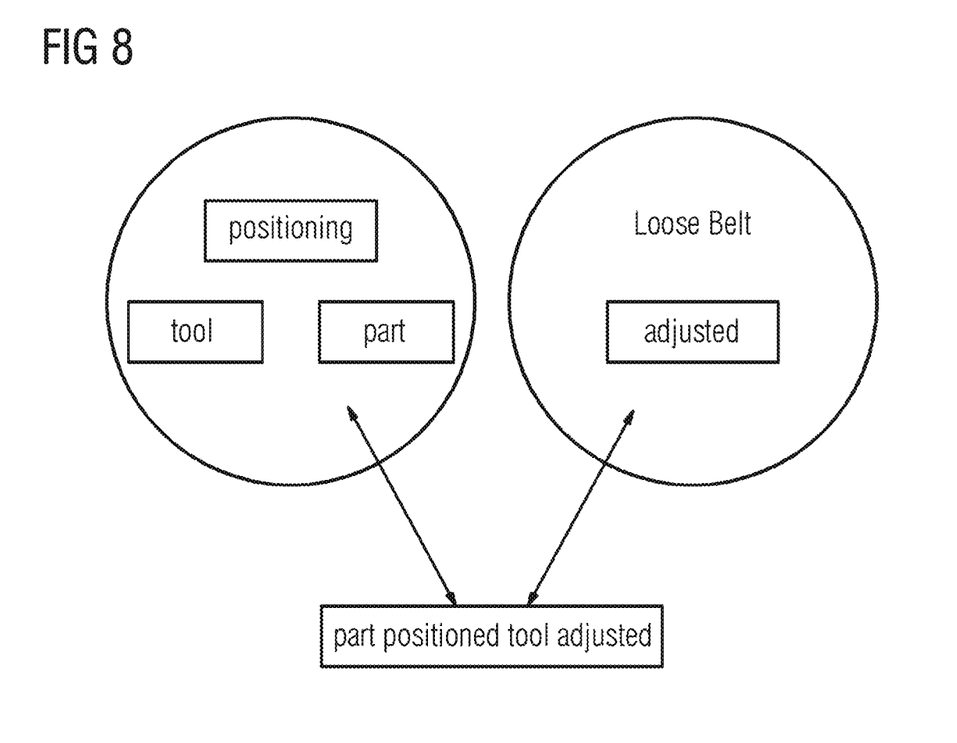
FIG. 8 depicts the determination of closeness of event to event cluster.

In FIG. 8, closeness of an event to an event cluster is determined using K-Means to define closeness of an event description to an event cluster. A Word-Cluster Matrix Wdkj and an Event-Word Matrix may be used to link an event to an event cluster.

Additionally, or alternatively, a graphical user interface (GUI) could be developed which guides a domain export through the labeling process by visualizing process data around the timestamps of the events, e.g., the entries in a (plant) log file. The GUI could also show the textual information so that the domain expert may decide whether the textual information may be considered as an appropriate label for the anomaly. However, this procedure is time consuming and requires a bigger effort.

Further embodiments include:

In a first embodiment: A method for monitoring of industrial devices (12-22), the method including: receiving sensor signal data (ssd) of one or more industrial devices (12-22) and one or more events (e) associated with the operation of the one or more industrial devices (12-22), identifying, (e.g., using a first autoencoder), an abnormal behavior (ab) of the one or more industrial devices (12-22) based on the sensor signal data (ssd), creating or updating an additional autoencoder based on the sensor signal data (ssd) associated with a time window ($t_{as}$, $t_{ae}$) relating to the abnormal behavior (ab), and associating events (e) located within the time window ($t_{as}$, $t_{ae}$) with the additional autoencoder.

In a second embodiment: The method according to the embodiment, including: associating textual information (i) of the one or more events (e) located within the time window ($t_{as}$, $t_{ae}$) with the additional autoencoder for transmission of a notification, the notification including the textual information associated with the additional autoencoder.

In a third embodiment: The method according to any one of the preceding embodiments, including: wherein the time window ($t_{as}$, $t_{ae}$) covers a time period between a start time ($t_{as}$) and an end time ($t_{ae}$) of the identified abnormal behavior (ab).

In a fourth embodiment: The method according to any one of the preceding embodiments, including: training the first autoencoder based on sensor signal data (ssd) representing a normal behavior (ab) of the one or more industrial devices (12-22).

In a fifth embodiment: The method according to any one of the preceding embodiments, including: wherein identifying an abnormal behavior (ab) of the one or more industrial devices (12-22) is based on a reconstruction error of the first autoencoder.

In a sixth embodiment: The method according to any one of the preceding embodiments 2 to 5, including: transmitting the notification after identifying the abnormal behavior (ab) by the additional autoencoder, e.g., based on a reconstruction error of the additional autoencoder.

In a seventh embodiment: The method according to any one of the preceding embodiments, including: assigning a timestamp (t) to textual information of one or more reports, e.g. log file or repair reports in electronic from, thereby creating one or more events (e).

In an eighth embodiment: The method according to any one of the preceding embodiments, including: processing the textual information (i) using one or more semantic networks in order to obtain a description of the abnormal behavior (ab) of the one or more industrial devices (12-22).

In a ninth embodiment: The method according to any one of the preceding embodiments, including: clustering the one or more events (e) and/or textual information (i) into a plurality of clusters, wherein each cluster represents a different abnormal behavior (ab) of the one or more industrial devices (12-22).

In a tenth embodiment: The method according to any one of the preceding embodiments, including: associating each cluster to an autoencoder, wherein each autoencoder represents a normal behavior or an abnormal behavior of the one or more industrial devices (12-22), wherein the textual information (i) of the clusters serves for describing the normal behavior (nb) or abnormal behavior (ab) identified.

In an eleventh embodiment: The method according to any one of the preceding embodiments, including: associating a cluster out of the plurality of clusters to an autoencoder based on comparing, e.g., using a weight matrix, the output of the one or more autoencoders with the time window of the abnormal behavior.

In a twelfth embodiment: The method according to any one of the preceding embodiments, including: updating the association between a cluster and the autoencoders based on the comparison according to the preceding claim.

In a thirteenth embodiment: The method according to any one of the preceding embodiments, including: creating, in case multiple autoencoders correlate with the sensor signal data (ssd) associated with the time window ($t_{as}$, $t_{ae}$) of abnormal behavior (ab), a combined autoencoder for identifying the abnormal behavior (ab).

In a fourteenth embodiment: An apparatus (2) operative to perform the method acts of any one of the preceding embodiments.

In a fifteenth embodiment: A computer program product, including program code that when executed performs any one of the method acts of the embodiments 1 to 13.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for monitoring of industrial devices, the method comprising:
receiving sensor signal data of one or more industrial devices and one or more events associated with operation of the one or more industrial devices;
identifying, using a first autoencoder, an abnormal behavior of the one or more industrial devices based on the sensor signal data;
creating or updating an additional autoencoder based on the sensor signal data associated with a time window relating to the abnormal behavior;
associating one or more of the events located within the time window with the additional autoencoder, wherein the one or more events are associated with textual information, and wherein the textual information is used to assign a cause for the abnormal behavior to the additional autoencoder for transmission of a notification; and
transmitting, by the additional autoencoder, the notification after the identifying of the abnormal behavior, wherein the notification comprises the textual information associated with the additional autoencoder.

2. The method of claim 1, wherein the time window covers a time period between a start time and an end time of the identified abnormal behavior.

3. The method of claim 1, further comprising:
training the first autoencoder based on sensor signal data representing a normal behavior of the one or more industrial devices.

4. The method of claim 1, wherein the identifying of the abnormal behavior of the one or more industrial devices is based on a reconstruction error of the first autoencoder.

5. The method of claim 1, wherein the transmitting of the notification after the identifying of the abnormal behavior by the additional autoencoder is based on a reconstruction error of the additional autoencoder.

6. The method of claim 1, further comprising:
assigning a timestamp (t) to the textual information, wherein the textual information is comprised in one or more reports, thereby creating the one or more events.

7. The method of claim 6, wherein the one or more reports are log file or repair reports in electronic form.

8. The method of claim 1, further comprising:
processing the textual information using one or more semantic networks in order to obtain a description of the abnormal behavior of the one or more industrial devices.

9. The method of claim 1, further comprising:
clustering the one or more events and/or the textual information into a plurality of clusters,
wherein each cluster of the plurality of clusters represents a different abnormal behavior of the one or more industrial devices.

10. The method of claim 9, further comprising:
associating each cluster of the plurality of clusters to a respective autoencoder of the first autoencoder and the additional autoencoder,
wherein each autoencoder represents a normal behavior or an abnormal behavior of the one or more industrial devices, and
wherein the textual information of the plurality of clusters serves for describing the normal behavior or the abnormal behavior identified, respectively.

11. The method of claim 9, further comprising:
associating a first cluster out of the plurality of clusters to an autoencoder of the first autoencoder and the additional autoencoder based on comparing an output of the first and additional autoencoders with the sensor signal data of the time window of the abnormal behavior.

12. The method of claim 11, wherein the comparing is conducted using a weight matrix.

13. The method of claim 11, further comprising:
updating the association between a cluster of the plurality of clusters and the first and additional autoencoders based on the comparison.

14. The method of claim 1, further comprising:
creating, in case multiple autoencoders correlate with the sensor signal data associated with the time window of the abnormal behavior, a combined autoencoder for identifying the abnormal behavior based on the multiple autoencoders.

15. An apparatus comprising:
a first autoencoder; and
an additional autoencoder,
wherein the apparatus is configured to:
receive sensor signal data of one or more industrial devices and one or more events associated with operation of the one or more industrial devices;
identify, using the first autoencoder, an abnormal behavior of the one or more industrial devices based on the sensor signal data;
create or update the additional autoencoder based on the sensor signal data associated with a time window relating to the abnormal behavior;
associate one or more of the events located within the time window with the additional autoencoder, wherein the one or more events are associated with textual information, and wherein the textual information is used to assign a cause for the abnormal behavior to the additional autoencoder for transmission of a notification; and
transmit, by the additional autoencoder, the notification after the identifying of the abnormal behavior, wherein the notification comprises the textual information associated with the additional autoencoder.

16. A non-transitory computer program product comprising program code that, when executed by a control unit, is configured to:
receive sensor signal data of one or more industrial devices and one or more events associated with operation of the one or more industrial devices;
identify, using a first autoencoder, an abnormal behavior of the one or more industrial devices based on the sensor signal data;
create or update an additional autoencoder based on the sensor signal data associated with a time window relating to the abnormal behavior;
associate one or more of the events located within the time window with the additional autoencoder, wherein the one or more events are associated with textual information, and wherein the textual information is used to assign a cause for the abnormal behavior to the additional autoencoder for transmission of a notification; and
transmit, by the additional autoencoder, the notification after the identifying of the abnormal behavior, wherein the notification comprises the textual information associated with the additional autoencoder.

* * * * *